United States Patent [19]
Ikeda

[11] Patent Number: 5,416,881
[45] Date of Patent: May 16, 1995

[54] OPTICAL FIBER AND OPTICAL WAVEGUIDE CONNECTING DEVICE

[75] Inventor: Mitsuakira Ikeda, Ibaraki, Japan

[73] Assignee: Nippon Sheet Glass Co., Ltd., Japan

[21] Appl. No.: 109,383

[22] Filed: Aug. 19, 1993

[30] Foreign Application Priority Data

| Aug. 20, 1992 | [JP] | Japan | 4-245633 |
| Aug. 20, 1992 | [JP] | Japan | 4-245634 |
| Aug. 21, 1992 | [JP] | Japan | 4-245624 |
| Aug. 21, 1992 | [JP] | Japan | 4-245625 |
| Aug. 21, 1992 | [JP] | Japan | 4-245626 |

[51] Int. Cl.$^6$ ............................................. G02B 6/36
[52] U.S. Cl. ........................................ 385/135; 385/31; 385/45; 385/46; 385/49; 385/51; 385/132; 385/134
[58] Field of Search .............. 385/14, 31, 33, 39, 385/42, 43, 45, 49, 51, 52, 55, 56, 66, 73, 70, 80, 81, 84, 86, 87, 88, 92, 93, 94, 95, 97, 98, 129, 130, 131, 132, 135, 136, 137

[56] References Cited

U.S. PATENT DOCUMENTS

| 4,871,226 | 10/1989 | Courtney et al. | 385/49 X |
| 4,917,451 | 4/1990 | Chouinard et al. | 385/49 X |
| 5,042,895 | 8/1991 | Chouinard et al. | 385/132 X |
| 5,080,458 | 1/1992 | Hockaday | 385/49 X |
| 5,260,587 | 11/1993 | Sato | 385/49 X |
| 5,313,546 | 5/1994 | Toffetti | 385/135 |
| 5,335,304 | 8/1994 | Smith et al. | 385/135 |
| 5,343,544 | 8/1994 | Boyd et al. | 385/46 |
| 5,361,382 | 11/1994 | Nakamura et al. | 385/49 |

FOREIGN PATENT DOCUMENTS

| 0277390 | 8/1988 | European Pat. Off. | 385/49 X |
| 2628848 | 9/1989 | France | 385/49 X |
| 50-137046 | 11/1975 | Japan | 385/55 X |
| 60-200210 | 3/1986 | Japan | 385/49 X |
| 63-291010 | 11/1988 | Japan | 385/49 X |
| 2-6911 | 1/1990 | Japan | 385/49 X |
| 2-15205 | 1/1990 | Japan | 385/49 X |
| 2-73207 | 3/1990 | Japan | 385/49 X |
| 3-39703 | 2/1991 | Japan | 385/49 X |
| 4-140702 | 5/1992 | Japan | 385/49 X |
| 4-175706 | 6/1992 | Japan | 385/49 X |
| 2086073 | 5/1980 | United Kingdom | 385/49 X |

*Primary Examiner*—Brian Healy
*Attorney, Agent, or Firm*—Merchant, Gould, Smith, Edell, Welter & Schmidt

[57] ABSTRACT

An optical waveguide device has a casing, a base member housed in the casing, at least one input optical fiber cable and at least one output optical fiber cable which are introduced into the casing, an optical waveguide substrate mounted on the base member and connected to respective ends of the input and output optical fiber cables for transmitting a light signal from the input optical fiber cable to the output optical fiber cable, support bases and holders fixed to the base member for holding end portions of the input and output optical fiber cables on the base member, and a bushing or bushings in the casing for introducing the input and output optical fiber cables into the casing. The optical waveguide substrate has an optical waveguide branched into a plurality of waveguide paths, and input and output optical fiber cables are coupled to each other through the optical waveguide.

18 Claims, 20 Drawing Sheets

OPTICAL FIBER AND OPTICAL WAVEGUIDE CONNECTING DEVICE

BACKGROUND OF THE INVENTION

1. Field of the Invention

The present invention relates to an optical waveguide device for use in optical communications, and more particularly to a shock-resistant optical waveguide device capable of keeping input and output optical fibers stably connected to an optical waveguide without causing an axial misalignment therebetween.

2. Description of the Prior Art

Known optical waveguide devices have a casing in the shape of a rectangular parallelepiped, a base member supporting an optical waveguide substrate with an optical waveguide formed therein, the base member being fixedly mounted in the casing through a support member of resin, and input and output optical fibers extending into the casing through a bushing on the casing.

The conventional optical waveguide devices are disadvantageous in that they are unable to sufficiently resist external forces such as shocks, tensile forces, or the like, i.e., the optical waveguide and the optical fibers tend to be disconnected or axially misaligned when subjected to external forces.

In many prior optical waveguide devices, the optical waveguide and the optical fibers are spliced by directly bonding and fixing a flat end face of the optical waveguide to flat end faces of the optical fibers. According to one splicing process, it has been necessary to position the optical waveguide and the optical fibers three-dimensionally along X-, Y-, and Z-axes, and then adjust the angles of the optical axes of the optical fibers with respect to the optical axis of the optical waveguide along the X-, Y-, and Z-axes so that the optical waveguide and the optical fibers are axially aligned for higher optical propagation efficiency. If the flat end faces of the optical waveguide and the optical fibers are not sufficiently bonded to each other, however, they can easily be axially misaligned under external forces.

The gap between the bushing and the optical fibers which extends through the bushing into the casing is filled with an adhesive that is simply applied from outside of the casing, thus hermetically sealing the casing. If the adhesive contains air bubbles or the bushing and the optical fibers are bonded through an insufficient adhesive area at the time the casing is shocked, then the casing may not be kept hermetically sealed well.

SUMMARY OF THE INVENTION

It is therefore an object of the present invention to provide an optical waveguide device which can sufficiently withstand external forces such as shocks thereby to prevent an optical waveguide and optical fibers from being disconnected or axially misaligned.

According to the present invention, there is provided an optical waveguide device comprising a casing, a base member housed in the casing, at least one input optical fiber cable and at least one output optical fiber cable which are introduced into the casing, an optical waveguide substrate mounted on the base member and connected to respective ends of the input and output optical fiber cables for transmitting a light signal from the input optical fiber cable to the output optical fiber cable, holding means fixed to the base member for holding end portions of the input and output optical fiber cables on the base member, and introducing means in the casing for introducing the input and output optical fiber cables into the casing. The optical waveguide substrate has an optical waveguide branched into a plurality of waveguide paths, and input and output optical fiber cables are coupled to each other through the optical waveguide.

The casing comprises an upper casing member and a lower casing member which are coupled to each other, the introducing means comprising a single bushing disposed in a boundary between the upper and lower casing members at one end of the casing, the input and output optical fiber cables being introduced into the casing through the single bushing. This arrangement is effective to reduce a space in which the optical waveguide device can be installed.

The bushing comprises a hollow bushing with a space defined therein, and the space is filled with a resin with the input and output optical fiber cables extending through the space for increased hermetically sealing capability.

The base member may be resiliently supported by support means in the casing for higher resistance to shocks. The casing may be filled with oil, and the base member may have orifices for allowing oil to flow therethrough for dampening applied shocks.

The optical waveguide device may further comprises a guide member held against an end of the optical waveguide substrate and having a positioning hole through which an end face of at least one of the waveguide paths is exposed, and at least one of the input and output optical fiber cables may have an end inserted in the positioning hole through matching oil and held against the end face. Alternatively, at least one of the waveguide paths may have a concave spherical end face exposed at an end of the optical waveguide substrate, and at least one of the input and output optical fiber cables may have a convex spherical end face fitted in the concave spherical end face. With such a splicing structure, the optical waveguide and the optical fiber can easily be spliced to each other and are prevented from being axially misaligned from each other.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
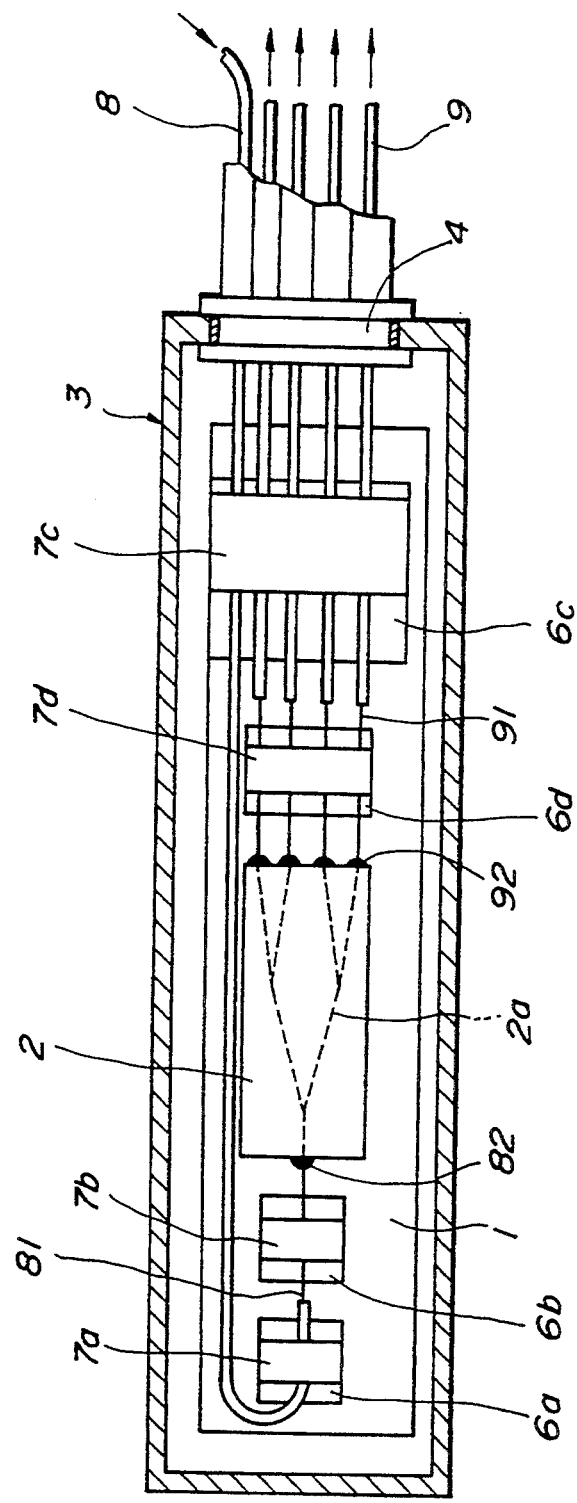
FIG. 1 is a horizontal cross-sectional view of an optical waveguide device according to a first embodiment of the present invention.

Like or corresponding parts are denoted by like or corresponding reference characters throughout views.

Figure 2:
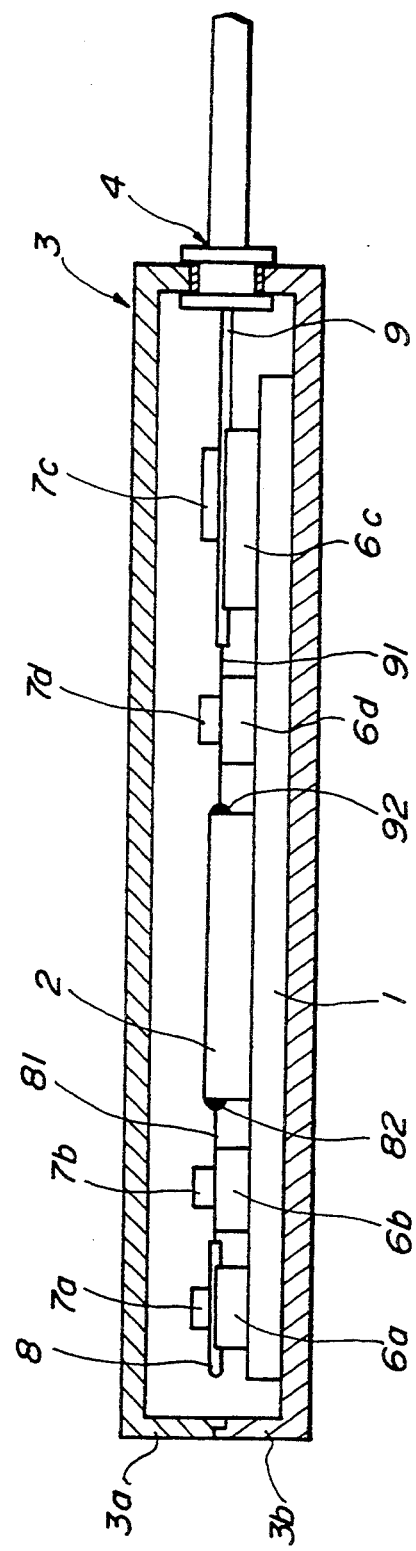
FIG. 2 is a vertical cross-sectional view of the optical waveguide device shown in FIG. 1.

As shown in FIGS. 1 and 2, an optical waveguide device according to a first embodiment of the present invention comprises a closed casing 3 in the shape of a rectangular parallelepiped composed of an upper casing member 3a and a lower casing member 3b, a flat base member 1 fixedly housed in the casing 3, a flat optical waveguide substrate 2 fixedly mounted on the base member 1 and having an optical waveguide 2a formed therein, successively spaced support bases 6a, 6b, 6c, 6d fixedly mounted on the base member 1 and supporting ends of input and output optical fiber cables 8, 9, successively spaced holders 7a, 7b, 7c, 7d mounted on the respective support bases 6a, 6b, 6c, 6d and holding the ends of the optical fiber cables 8, 9, and a bushing 4 mounted on the casing 3 and through which the optical fiber cables 8, 9 extend into the casing 3. The base member 1 is fixed to an inner surface of the lower casing 3b. However, the base member 1 may be mounted in the casing 3 in any of various other fashions.

The input optical fiber cable 8 has an end portion extending into the casing 3 through the bushing 4, i.e., an optical fiber introducing means, that is disposed in a boundary between the upper and lower casing members 3a, 3b. The end portion of the input optical fiber cable 8 is supported on the base member 1 by the support base 6a and the holder 7a. The end portion of the input optical fiber cable 8 has its cover layer peeled off, exposing an optical fiber 81 that is supported by the support base 6b and the holder 7b. The optical fiber 81 has a distal end mechanically spliced to an end face of the optical waveguide 2a at one end of the optical waveguide substrate 2 and bonded in position by an adhesive 82.

The four output optical fiber cables 9 have respective end portions extending into the casing 3 through the bushing 4. The end portion of each of the output optical fiber cables 9 is supported on the base member 1 by the support base 6c and the holder 7c. The end portion of each of the output optical fiber cables 9 has its cover layer peeled off, exposing an optical fiber 91 that is supported by the support base 6d and the holder 7d. The optical fibers 91 have respective distal ends mechanically spliced to an end face of the optical waveguide 2a at the other end of the optical waveguide substrate 2 and bonded in position by an adhesive 92.

The optical waveguide 2a is branched from a single waveguide path into a plurality of (four in the illustrated embodiment) output waveguide paths for transmitting a single light signal from the input optical fiber cable 8 as four light signals into the respective output optical fiber cables 9. The optical waveguide 2a is formed as a region having a higher refractive index than the surrounding region, for example, by the ion exchange process. However, the optical waveguide 2a may be formed in any of various other manufacturing processes. The optical waveguide 2a may have one or more input waveguide paths and may have four or more or less output waveguide paths.

The major components of the optical waveguide device, i.e., the optical waveguide substrate 2, the end portions of the input and output optical fiber cables 8, 9, the support bases 6a–6d and the holders 7a–7d, are placed on the base member 1 and fixedly housed in the closed casing 3. Therefore, external forces such as shocks are prevented from being directly applied to the optical waveguide substrate 2 and the exposed optical fibers 81, 91 or the spliced and bonded joints 82, 92 therebetween. Even when the optical fiber cables 8, 9 are subjected to tensile forces, since the optical fiber cables 8, 9 are securely held on the base member 1 by the support bases 6a–6d and the holders 7a–7d, the spliced and bonded joints 82, 92 are prevented from being damaged. Consequently, the optical waveguide device is of a shock-resistant structure capable of sufficiently withstanding external forces such as shocks and tensile forces. Inasmuch as the input and output optical fiber cables 8, 9 introduced into the casing 3 are disposed on one side within the casing 3, the optical waveguide device may be of a low profile. Therefore, the optical waveguide device may be installed in a relatively small space, e.g., may be inserted into a small space through an end thereof. Since the input and output optical fiber cables 8, 9 can be installed on the base member 1 with the upper casing member 3a removed, they can be mounted in place from one side of the casing 3. Thus, any space required for the worker to install the input and output optical fiber cables 8, 9 in the casing 3 may be relatively small.

In the above embodiment and also following embodiments, a single light signal from the input optical fiber cable 8 is divided into four light signals which are transmitted into the respective output optical fiber cables 9. However, there may be employed four input optical fiber cables and a single output optical fiber cable, so that four light signals from the respective four input optical fiber cables are combined or coupled into a single light cable that is transmitted into the single output optical fiber cable.

An optical waveguide device according to a second embodiment of the present invention will be described below with reference to FIGS. 3 through 6. The optical waveguide device according to the second embodiment employs a hermetically sealed bushing.

Figure 3:
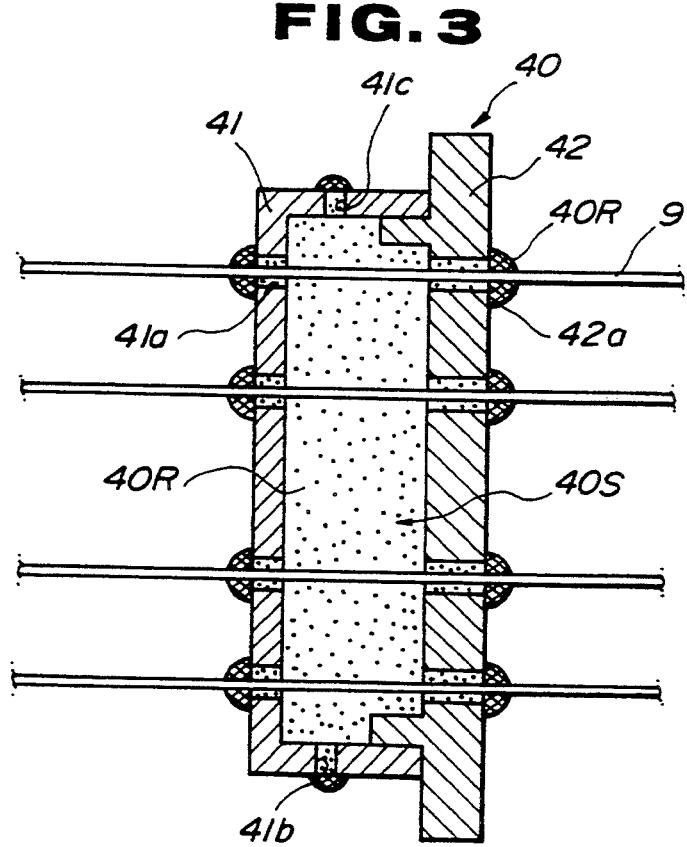
FIG. 3 is a vertical cross-sectional view of a hermetically sealed bushing.
Figure 4:
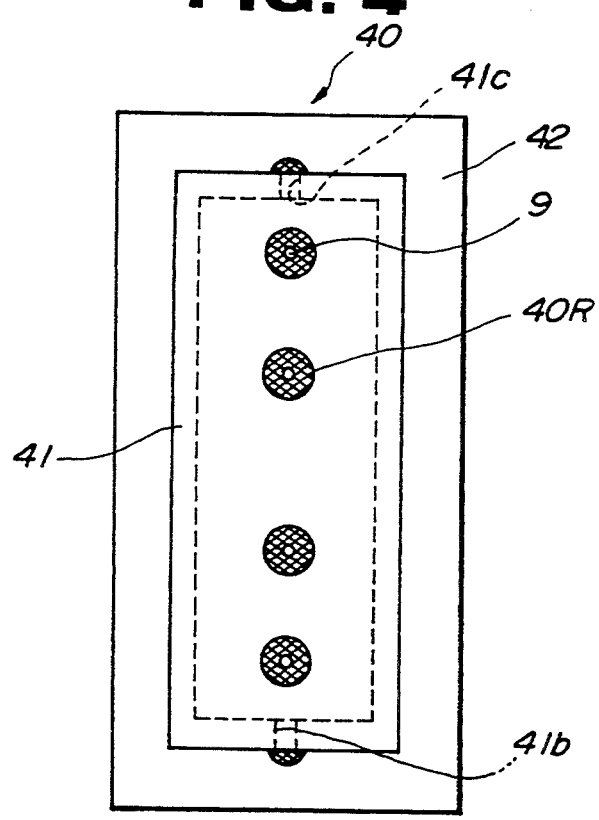
FIG. 4 is a front elevational view of the bushing shown in FIG. 3.

FIGS. 3 and 4 show, at an enlarged scale, a hermetically sealed bushing 40 for use in an optical waveguide device. As shown in FIGS. 3 and 4, the bushing 40 is of a hollow structure composed of a cover 41 and a case 42 which are interfitted, defining a space 40S between. The cover 41 and the case 42 have respective through holes 41a, 42a defined in confronting positions and through which four output optical fiber cables extend. The cover 41 also has a through hole 41b defined in a side panel thereof for filling a resin 40R into the space 40S, and a through hole 41c for letting air go out of the space 40S.

For filling the space 40S with the resin 40R, the output optical fiber cables 9 are inserted through the holes 41a, 42a in the bushing 40, directing the hole 41b downwardly and the hole 41c upwardly, and the resin 40R, which may be a low-viscosity thermosetting adhesive resin, is injected through the hole 41b into the space 40S. Since the resin 40R is low in viscosity, it fills the space 40S and the holes 41a, 42a, 41b, 41c while forcing air bubbles from the resin 40R and air from the space 40S.

When the resin 40R starts being discharged from the holes 41a, 42a, 41c, the injection of the resin 40R from the hole 41b is stopped. Then, the bushing 40 is heated to thermoset the resin 40R. When the resin 40R is thermoset, the bushing 40 and the optical fiber cables 9 are intimately coupled to each other by the resin 40R in the holes 41a, 42a and the space 40S.

Figure 5:
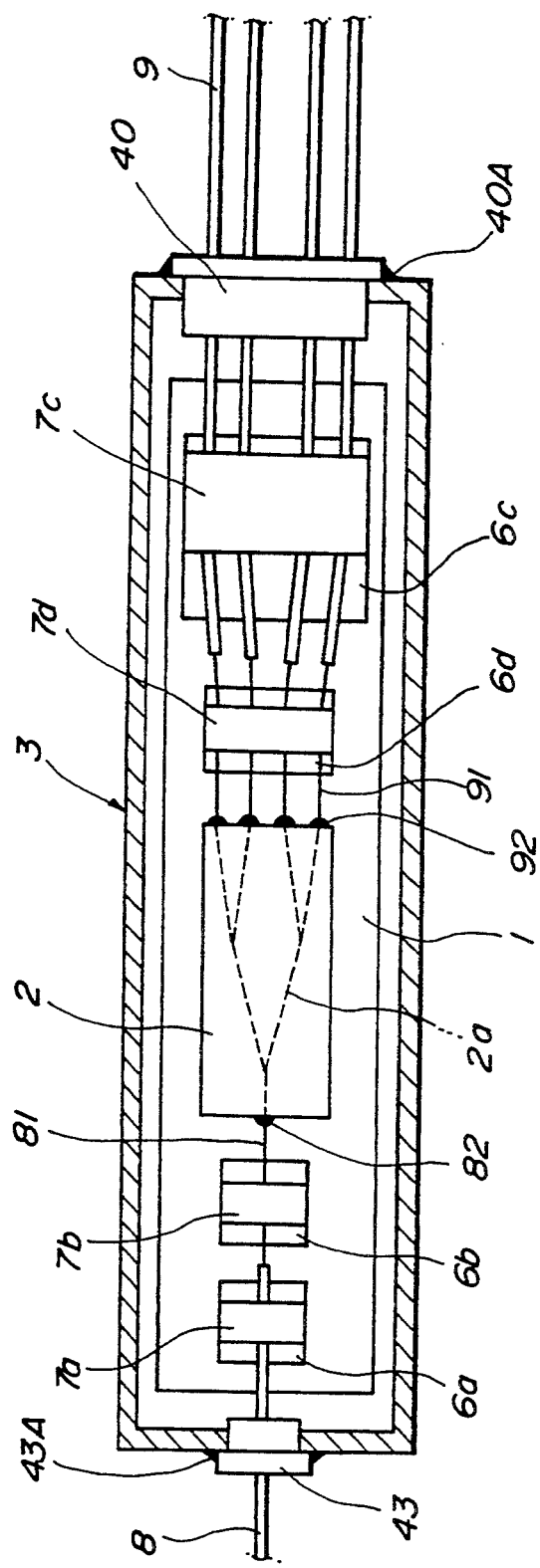
FIG. 5 is a horizontal cross-sectional view of an optical waveguide device according to a second embodiment of the present invention, which incorporates the bushing shown in FIG. 3.
Figure 6:
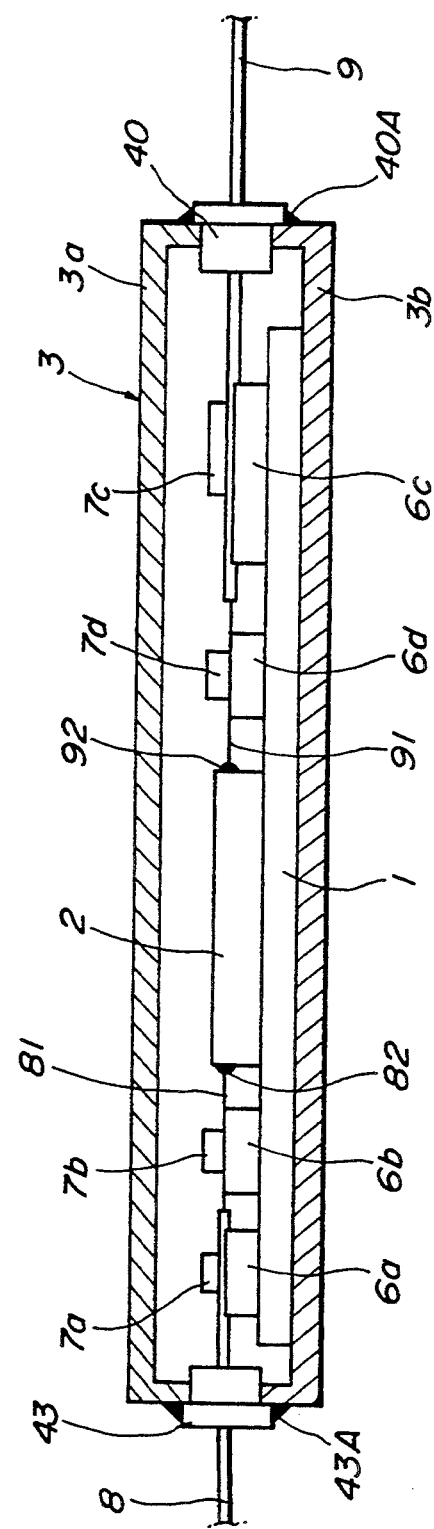
FIG. 6 is a vertical cross-sectional view of the optical waveguide device shown in FIG. 5.

The optical waveguide device according to the second embodiment which incorporates the bushing 40 is shown in FIGS. 5 and 6. In the optical waveguide device according to the second embodiment, the input optical fiber cable 8 is introduced into the casing 3 through a bushing 43 that is located on an end of the casing 3 opposite to the bushing 40 through which the output optical cables 9 are introduced into the casing 3. Except for the bushing 43, the internal structure of the casing 3 is essentially the same as the casing 3 according to the first embodiment described above. The bushing 43 is substantially identical in structure to the bushing 40. The bushings 40, 43 are held in contact with outer surfaces of the casing 3, and any gaps therebetween are filled with respective adhesives 40A, 43A, thus keeping the casing 3 hermetically sealed.

In the second embodiment, external moisture and air are prevented from entering the casing 3 through the bushings 40, 43. While the resin 40R is being filled into the space 40S between the cover 41 and the case 42, air bubbles entrapped in the resin 40R can be discharged through the hole 41c which is positioned upwardly. The bushings 40, 43 are therefore hermetically sealed, and hence no hole is formed through the bushings 40, 43 between the ambient space and the casing 3. Consequently, the casing 3 is highly hermetically sealed. Furthermore, since the optical cables and the bushings are unitized by the filled resin, they can easily and quickly be installed on and removed from the casing 3.

The hermetically sealed bushing shown in FIGS. 3 and 4 may be incorporated in the optical waveguide device according to the first embodiment and any other optical waveguide devices according to any other embodiments described below.

Figure 7:
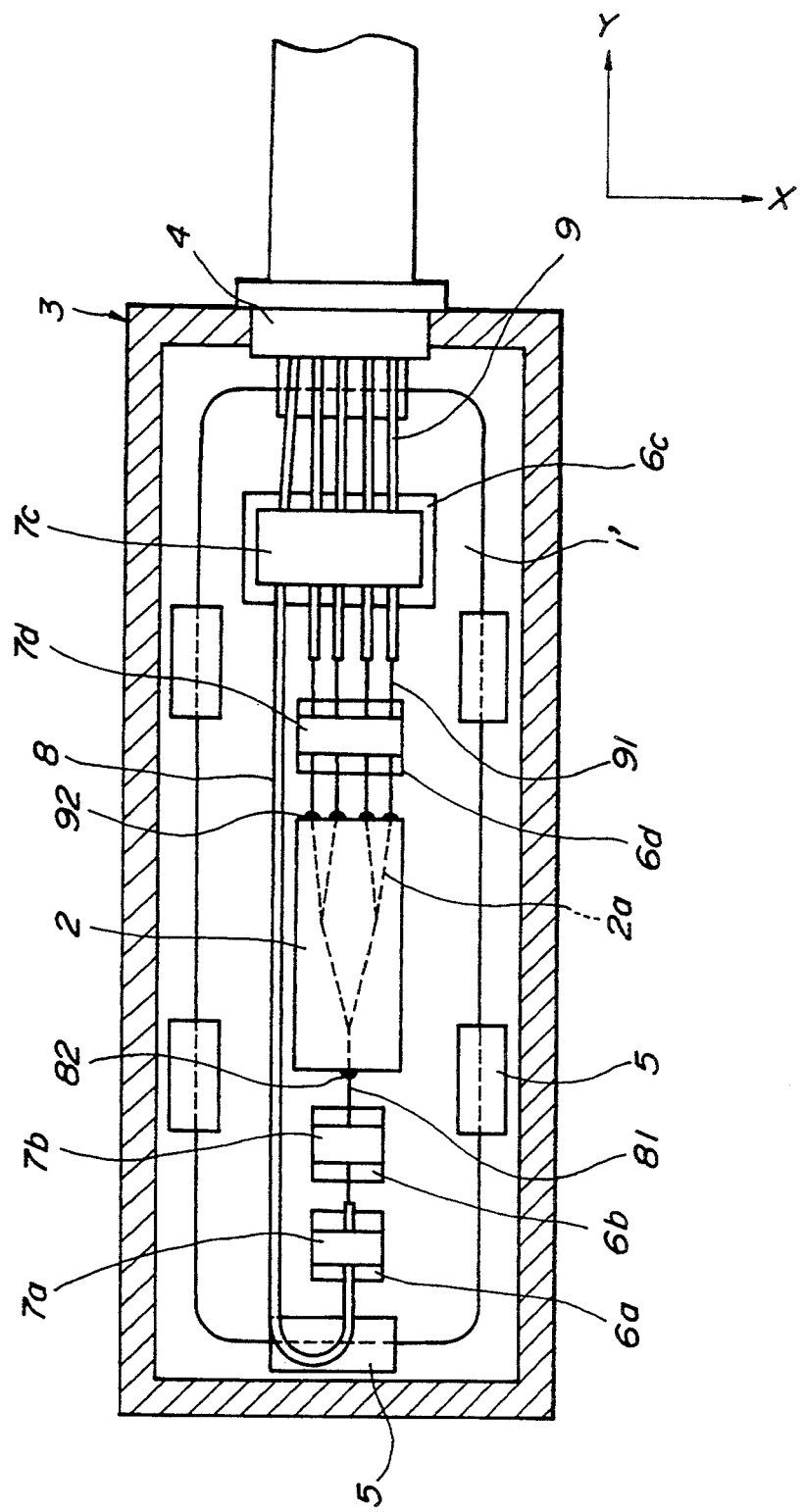
FIG. 7 is a horizontal cross-sectional view of an optical waveguide device according to a third embodiment of the present invention.
Figure 8:
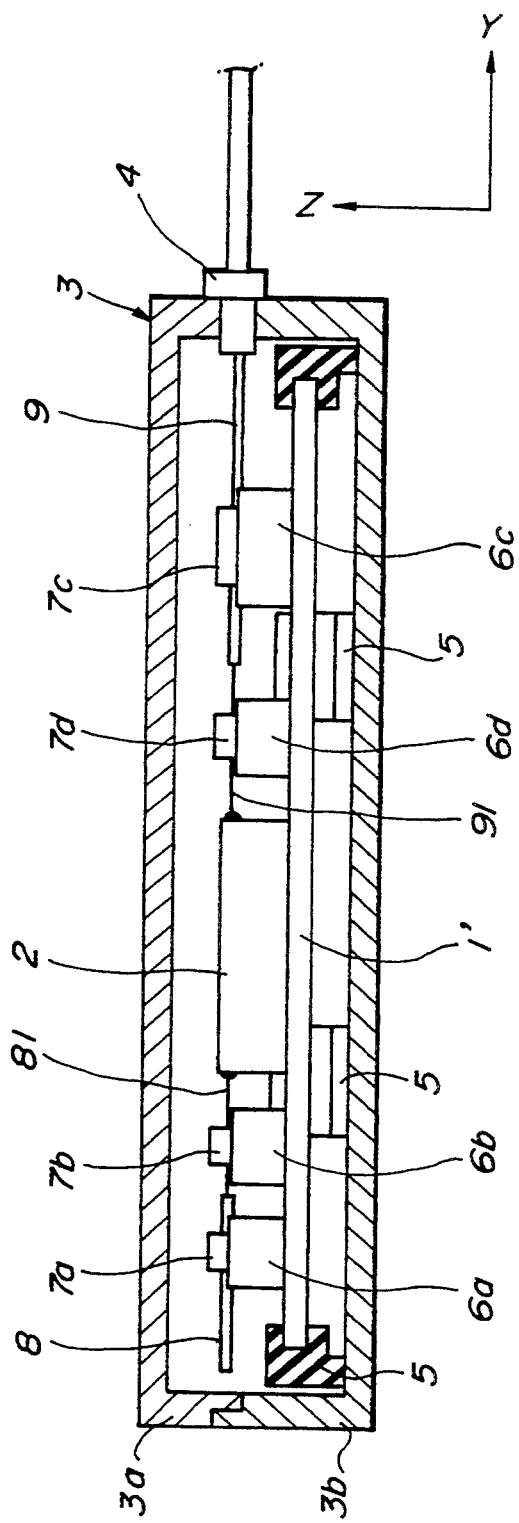
FIG. 8 is a vertical cross-sectional view of the optical waveguide device shown in FIG. 7.

FIGS. 7 and 8 show an optical waveguide device according to a third embodiment of the present invention.

As shown in FIG. 7, the input optical fiber cable 8 and the output optical fiber cables 9 are introduced into the casing 3 through the bushing 4 that is mounted on one end of the casing 3. The optical waveguide device according to the third embodiment is substantially identical in structure to the optical waveguide device according to the first embodiment. However, the optical waveguide device according to the third embodiment has a base member 1' fixedly mounted in the casing 3, e.g., on an inner surface of the lower casing member 3b, through a plurality of resilient support legs 5 made of a resilient material such as rubber.

More specifically, the base member 1' has a plurality of (six in the illustrated embodiment) spaced peripheral edge portions gripped by the respective resilient support legs 5 that are fixed to the inner surface of the lower casing member 3b. When shocks are applied to the base member 1' in the direction indicated by the arrow X, Y, or Z or in a combination of these directions, the resilient support legs 5 are resiliently deformed in the corresponding direction or directions, thus dampening the applied shocks. Consequently, the applied shocks are prevented from being directly applied to the optical waveguide substrate 2 and spliced and bonded joints between the optical waveguide substrate 2 and the optical fibers 81, 91.

A first modification of the optical waveguide device according to the third embodiment will be described below with reference to FIGS. 9 and 10.

According to the first modification, the entire peripheral edge of a base member 10 is gripped by a support member 51 which extends fully around the base member 10. The support member 51 is preferably made of a resilient material, and is fixed to an inner surface of the lower casing member 3b, for example.

Figure 10:
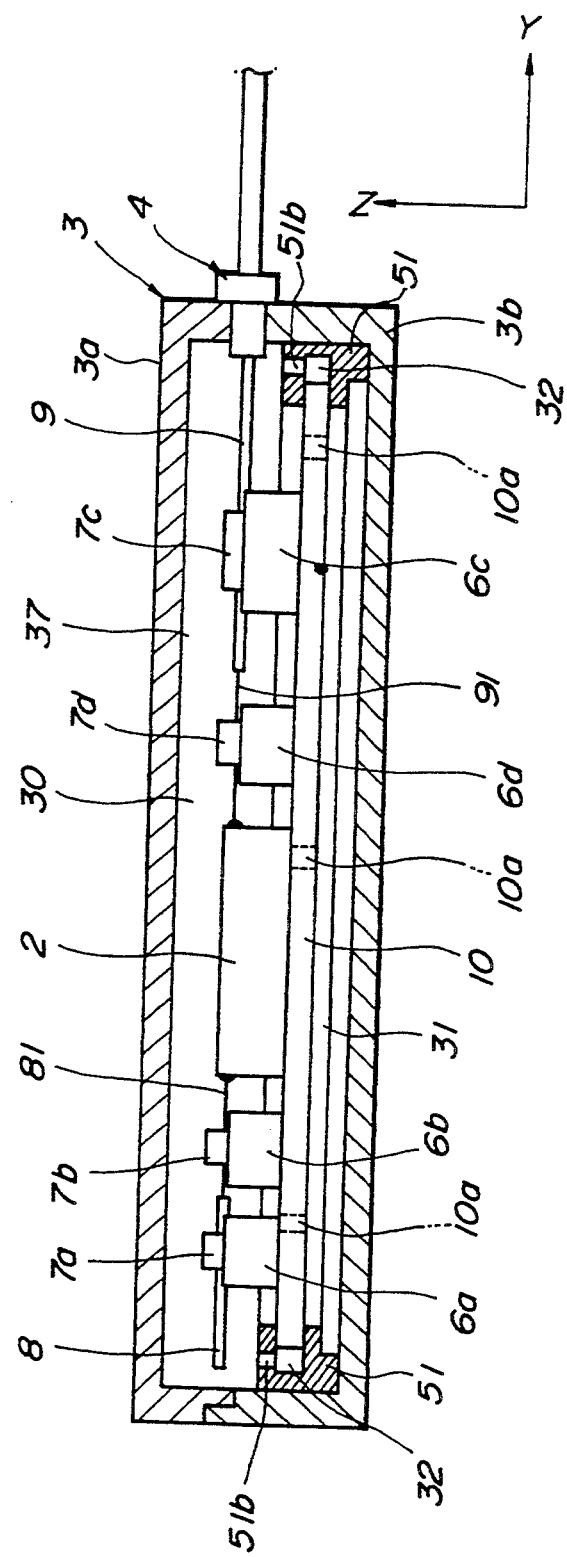
FIG. 10 is a vertical cross-sectional view of the optical waveguide device shown in FIG. 9.

As shown in FIG. 10, the support member 51 has a space 32 defined therein throughout its length, and the space 32 is bounded partly by the peripheral edge of the base member 10. An upper space 30 is defined in the casing 3 by the base member 10, the upper casing 3a, and a portion of the lower casing 3b. The space 32 is held in communication with the upper space 30 through a plurality of (six in the illustrated modification) of orifices 51a, 51b that are defined in the support member 51. The base member 10 has a plurality of (six in the illustrated modification) of orifices 10a which provides communication between the upper space 30 and a lower space 31 which is defined in the casing 3 by the base member 10, the support member 51, and the lower casing 3b.

In the first modification, the closed casing 3 is filled with oil 37.

Figure 9:
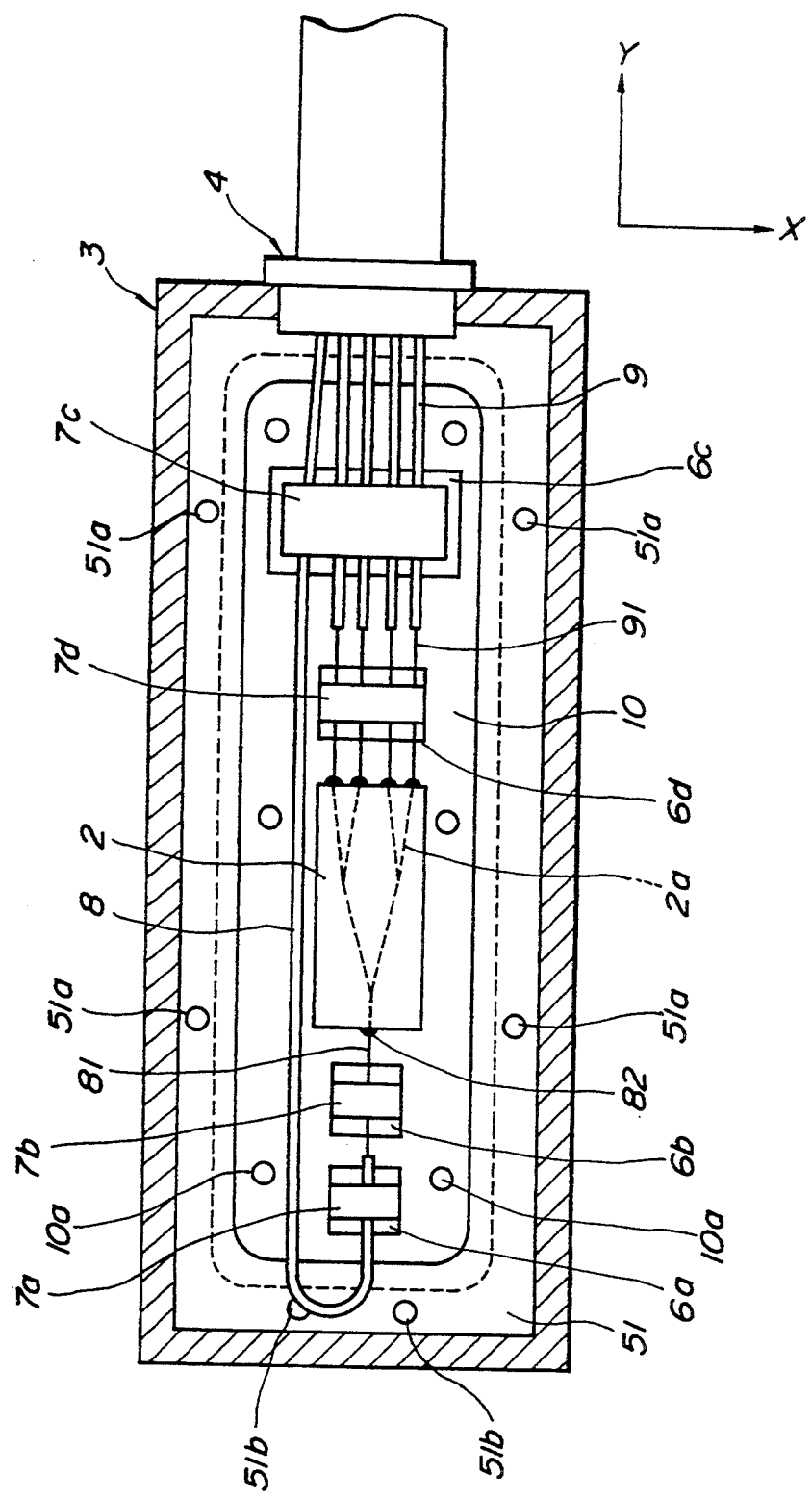
FIG. 9 is a horizontal cross-sectional view of an optical waveguide device according to a first modification of the optical waveguide device shown in FIG. 7.

When external forces such as shocks are applied to the casing 3 in the direction X as shown in FIG. 9, the base member 10 is displaced in the direction X. Now, a portion of the oil 37 flows from the space 32 into the upper space 30 through the orifices 51a. The applied shocks are therefore dampened, and prevented from being directly applied to the optical waveguide substrate 2, or the exposed optical fibers 81, 91, or the spliced and bonded joints between the optical waveguide 2a and the optical fibers 81, 91.

When external forces such as shocks are applied to the casing 3 in the direction Y as shown in FIGS. 9 and 10, the base member 10 is displaced in the direction Y. Since a portion of the oil 37 flows from the space 32 into the upper space 30 through the orifices 51b, the applied shocks are therefore dampened, and prevented from being directly applied to the optical waveguide substrate 2, or the exposed optical fibers 81, 91, or the spliced and bonded joints between the optical waveguide 2a and the optical fibers 81, 91.

When external forces such as shocks are applied to the casing 3 in the direction Z as shown in FIG. 10, the base member 10 is displaced in the direction Z (provided the support member 51 is made of a resilient material). Since a portion of the oil 37 flows from the upper and lower spaces 30, 31 into the upper space 30 or the lower space 31 through the orifices 10a, the applied shocks are therefore dampened, and prevented from being directly applied to the optical waveguide substrate 2, or the exposed optical fibers 81, 91, or the spliced and bonded joints between the optical waveguide 2a and the optical fibers 81, 91.

Shocks applied in a combination of the directions X, Y, Z are divided in these directions and dampened.

An optical waveguide device according to a second modification of the third embodiment will be described below with reference to FIGS. 11 through 13.

According to the second modification, the major components of the optical waveguide device, i.e., the optical waveguide substrate 2, the end portions of the input and output optical fiber cables 8, 9, the support bases 6a–6d and the holders 7a–7d, are placed on a base member 11. These major components and the base member 11 are housed in a package 12 substantially in the shape of a rectangular parallelepiped which is fixedly mounted on a mount 11' and filled with an inert gas.

Figure 12:
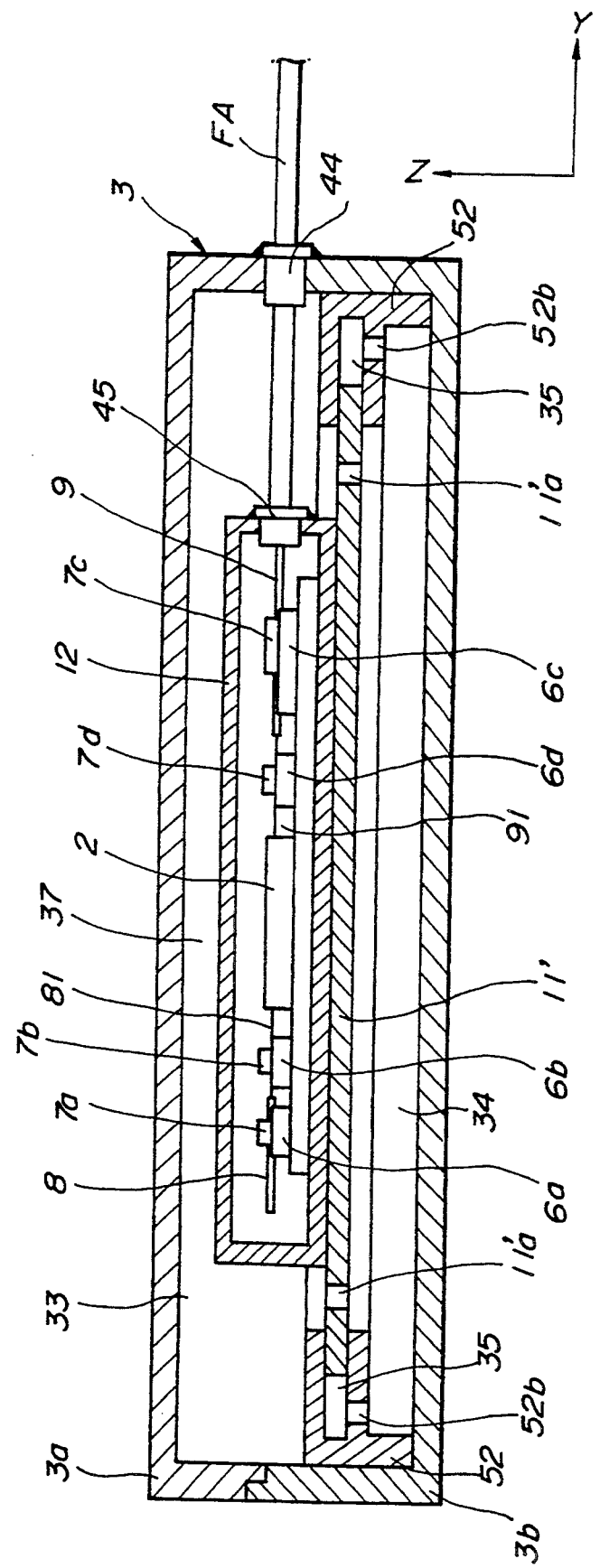
FIG. 12 is a vertical cross-sectional view of the optical waveguide device shown in FIG. 11.

As shown in FIG. 12, the mount 11' has its entire peripheral edge gripped by a support member 52 that has a space 35 defined therein, the space 35 being bounded partly by the peripheral edge of the mount 11'. The support member 52 is preferably made of a resilient material, and is fixedly mounted in the casing 3, e.g., on an inner surface of the lower casing member 3b.

The support member 52 has a plurality of (ten in the illustrated embodiment) orifices 52a, 52b defined therein which provide communication between the space 35 and a lower space 34 in the casing 3 which is defined by the mount 11', the support member 52, and a portion of the lower casing member 3b. The mount 11' has a plurality of (eight in the illustrated embodiment) orifices 11'a defined therein which provide communication between the lower space 34 and an upper space 33 in the casing 3 which is defined by the mount 11', the package 12, the support member 52, and the upper casing member 3a.

In the second modification, the closed casing 3 is also filled with oil 37.

An optical fiber array FA composed of input and output optical fiber cables 8, 9 is introduced into the casing 3 through a bushing 44 that is disposed in a boundary between the upper and lower casing members 3a, 3b, and also introduced into the package 12 through a bushing 45 on an end of the package 12.

Figure 11:
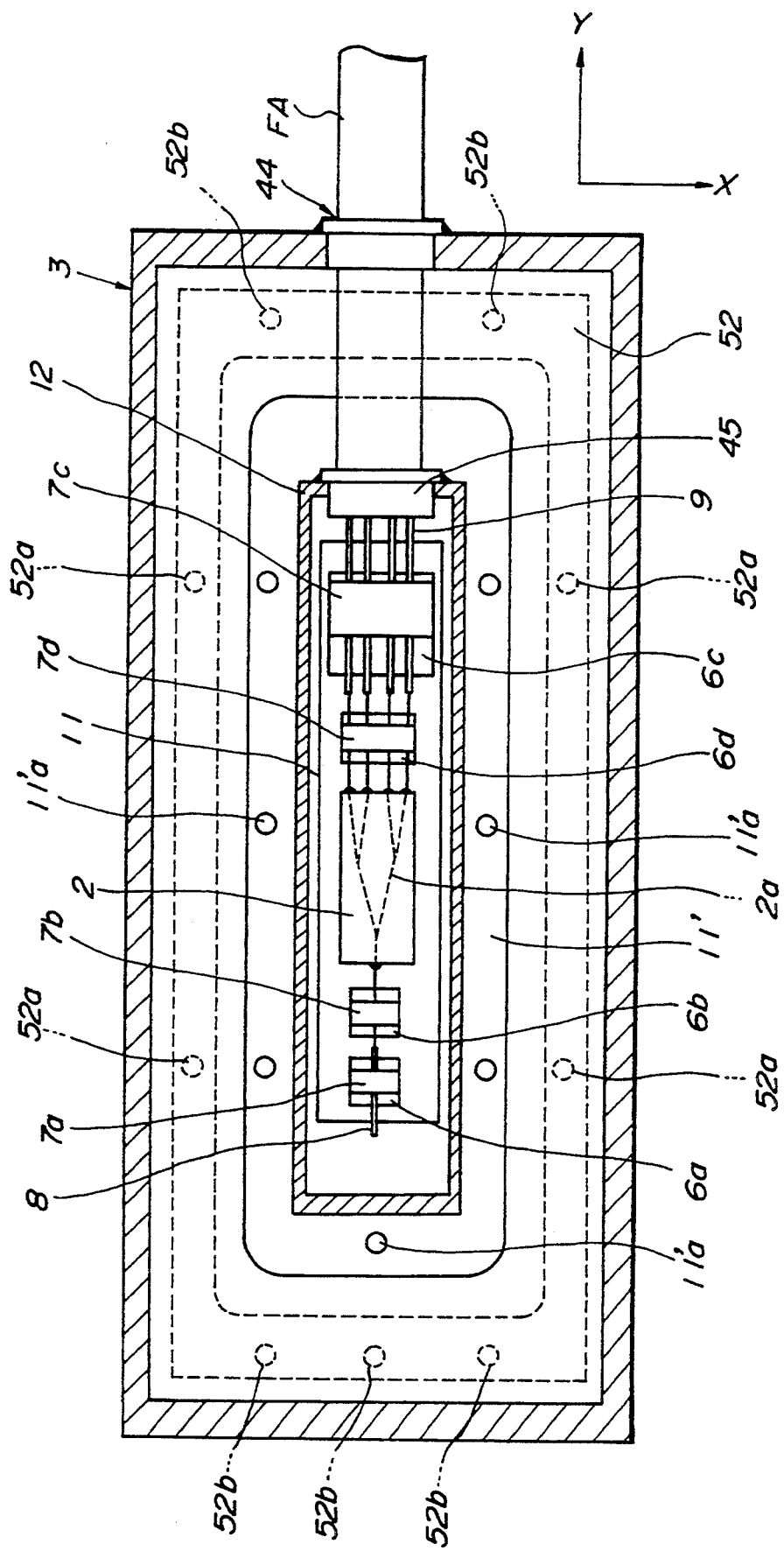
FIG. 11 is a horizontal cross-sectional view of an optical waveguide device according to a second modification of the optical waveguide device shown in FIG. 7.
Figure 13:
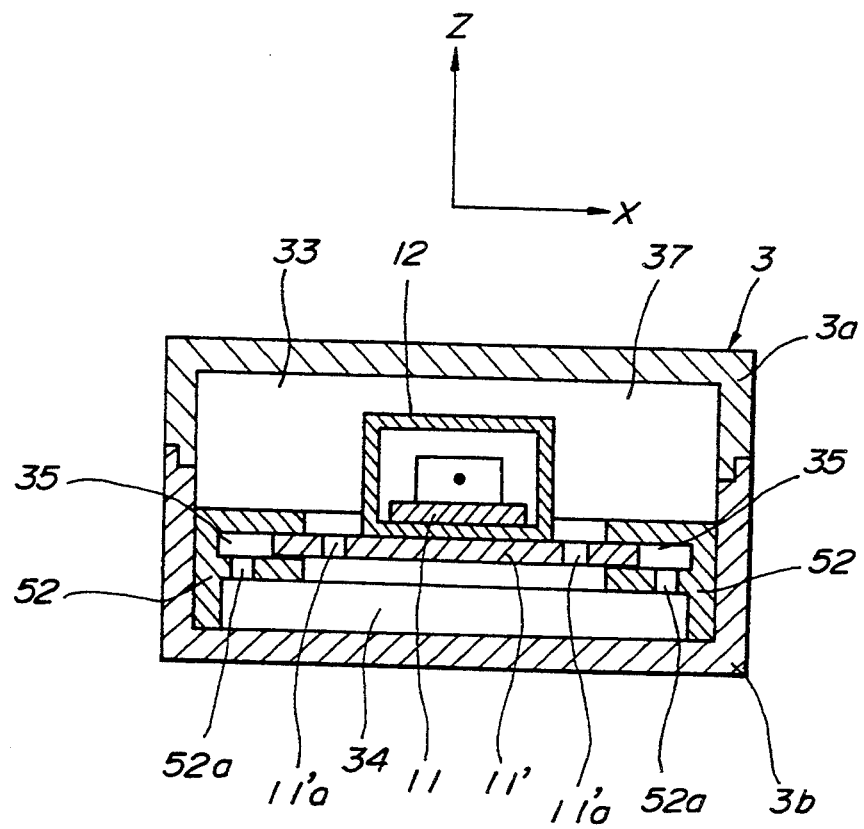
FIG. 13 is another vertical cross-sectional view of the optical waveguide device shown in FIG. 11.

When external forces such as shocks are applied to the casing 3 in the direction X as shown in FIGS. 11 and 13, the mount 11' is displaced in the direction X. Now, a portion of the oil 37 flows from the space 35 into the lower space 34 through the orifices 52a. The applied shocks are therefore dampened, and prevented from being directly applied to the optical waveguide substrate 2, or the exposed optical fibers 81, 91, or the spliced and bonded joints between the optical waveguide 2a and the optical fibers 81, 91.

When external forces such as shocks are applied to the casing 3 in the direction Y as shown in FIGS. 11 and 12, the mount 11' is displaced in the direction Y. Since a portion of the oil 37 flows from the space 35 into the lower space 34 through the orifices 52b, the applied shocks are therefore dampened, and prevented from being directly applied to the optical waveguide substrate 2, or the exposed optical fibers 81, 91, or the spliced and bonded joints between the optical waveguide 2a and the optical fibers 81, 91.

When external forces such as shocks are applied to the casing 3 in the direction Z as shown in FIGS. 12 and 13, the mount 11' is displaced in the direction Z (provided the support member is made of a resilient material). Since a portion of the oil 37 flows from the spaces 33, 34 into the upper space 33 or the lower space 34 through the orifices 11'a, the applied shocks are therefore dampened, and prevented from being directly applied to the optical waveguide substrate 2, or the exposed optical fibers 81, 91, or the spliced and bonded joints between the optical waveguide 2a and the optical fibers 81, 91.

Shocks applied in a combination of the directions X, Y, Z are divided in these directions and dampened.

In the optical waveguide devices according to the third embodiment and its two modifications, shocks applied to the casing are absorbed by a dampening mechanism composed of the (resilient) support member, the oil, and the orifices. Accordingly, such shocks are not directly imposed on the joints between the optical waveguide and the optical fibers, and hence the optical waveguide and the optical fibers are prevented from being disconnected or axially misaligned from each other. Because the optical waveguide device according the second modification, in particular, has a double package structure, it has a better shock dampening capability and keeps the package hermetically sealed more effectively for isolation from external temperatures.

An optical waveguide device according to a fourth embodiment will be described below with reference to FIGS. 14 through 19. The optical waveguide device according to the fourth embodiment employs a special splicing structure for allowing an optical waveguide and an optical fiber to be spliced easily and quickly while maintaining a desired optical propagation efficiency.

Figure 14:
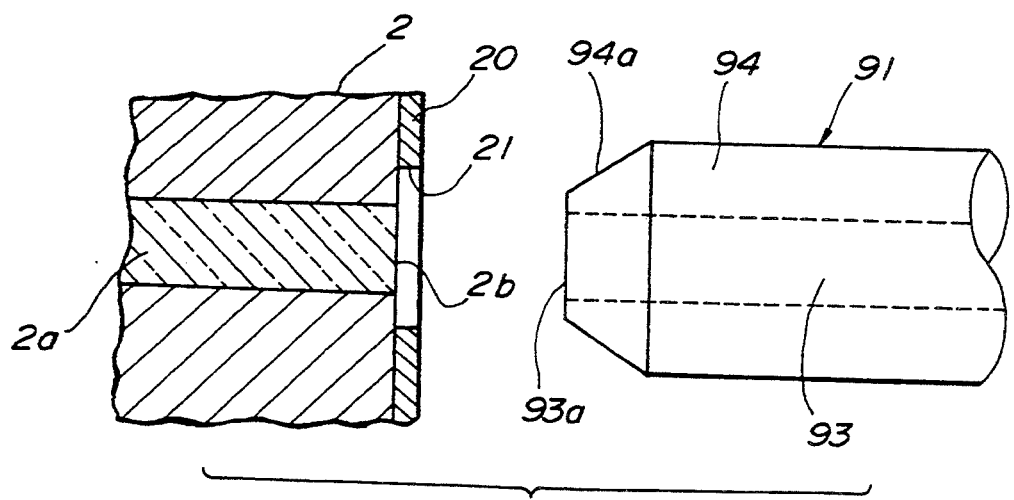
FIG. 14 is a side elevational view, partly in cross section, of an optical waveguide (substrate) and an optical fiber, before they are spliced, for use in an optical waveguide device according to a fourth embodiment of the present invention.
Figure 15:
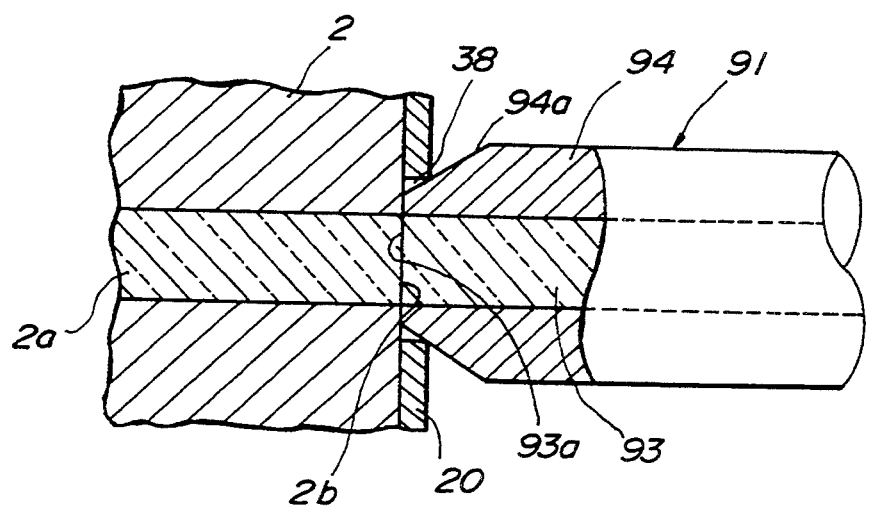
FIG. 15 is a side elevational view, partly in cross section, of the optical waveguide and the optical fiber, after they are spliced, shown in FIG. 14.
Figure 16:
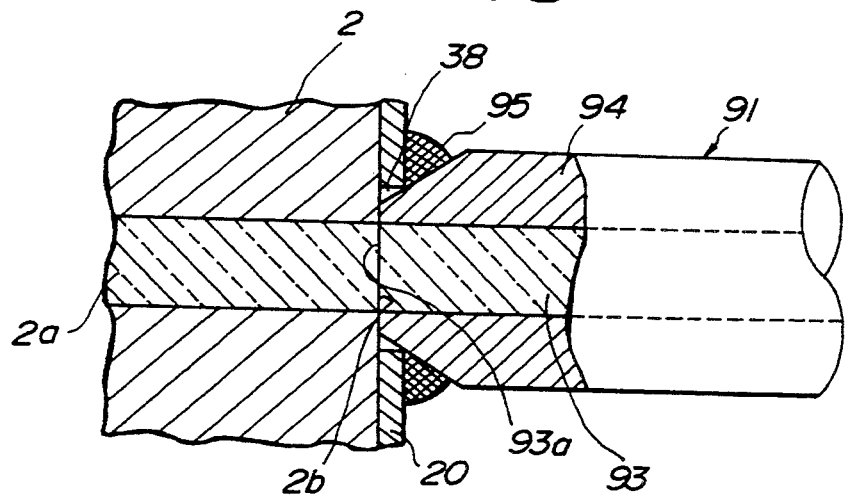
FIG. 16 is a side elevational view, partly in cross section, of the optical waveguide and the optical fiber shown in FIG. 15 with an adhesive applied.

In FIGS. 14 through 16, only one set of an optical waveguide, an optical fiber, and a positioning hole are shown for the sake of brevity. As shown in FIG. 14, a guide member 20 having positioning holes 21 which exposes an end face 2b of the optical waveguide 2a is held against an end of the optical waveguide substrate 2. An optical fibber 91 includes a core 93 having a flat distal end face 93a and a cladding 94 having a tapered distal end face 94a. The positioning hole 21 of the guide member 20 is shaped such that the optical waveguide 2a in the optical waveguide substrate 2 is axially aligned with the optical fiber 91 by simply inserting the distal end of the optical fiber 91 into the positioning hole 21. To splice the optical waveguide substrate 2 and the optical fiber 91, as shown in FIG. 15, matching oil 38 is first poured into the positioning hole 21, and then the distal end faces 93a, 94a of the optical fiber 91 are inserted into the positioning hole 21, after which the end face 2b of the optical waveguide 2a and the distal end face 93a of the core 93 are brought into contact with each other and hence mechanically spliced to each other. As shown in FIG. 16, an adhesive 95, e.g., an ultraviolet-curing resin, may be filled between the guide member 20 and the optical fiber 91 around the spliced joint to bond the optical waveguide 2a and the optical fiber 91 to each other.

Figure 17:
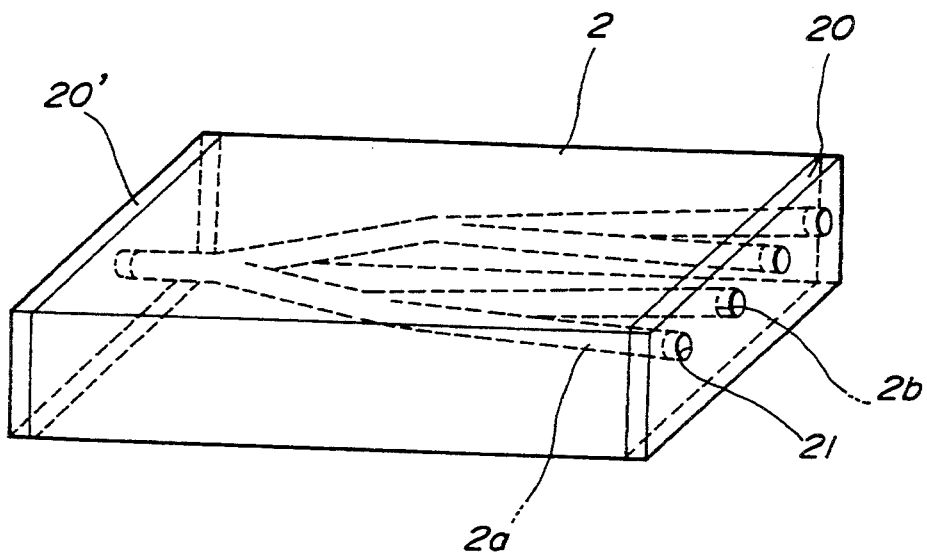
FIG. 17 is a perspective view of an optical waveguide substrate for use in the optical waveguide device according to the fourth embodiment of the present invention.

In the fourth embodiment, the guide member 20 is used on the flat optical waveguide substrate 2 with the optical waveguide 2a for dividing a single light signal into four light signals. The guide member 20 on the end of the optical waveguide substrate 2 actually has four positioning holes 21 corresponding to the four waveguide paths of the optical waveguide 2a. More specifically, as shown in FIG. 17, a single guide member 20 having four positioning holes 21 is fixedly held against the output end of the flat optical waveguide substrate 2, and a guide member 20' having a single positioning hole 21 is fixedly held against the input end of the flat optical waveguide substrate 2. Therefore, the optical waveguide 2a can easily be axially aligned with the optical fibers 91, 81 simply by inserting the optical fibers 91, 81 into the respective positioning holes 21 in the guide members 20, 20'.

Figure 18:
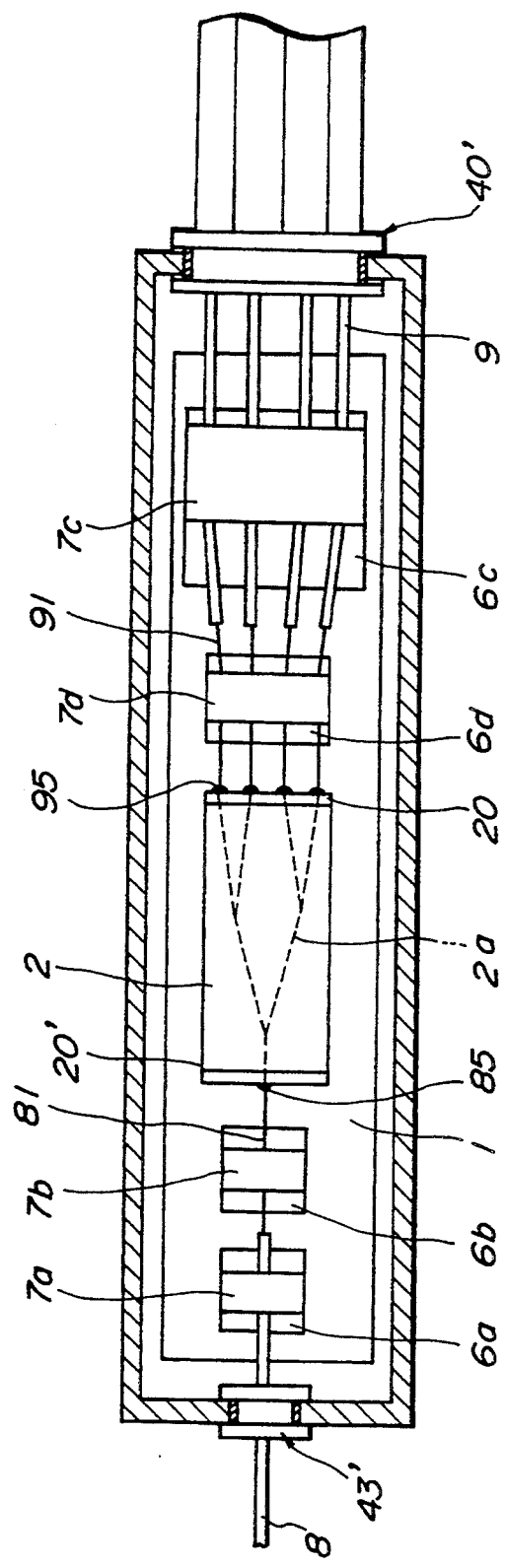
FIG. 18 is a horizontal cross-sectional view of the optical waveguide device according to the fourth embodiment of the present invention.
Figure 19:
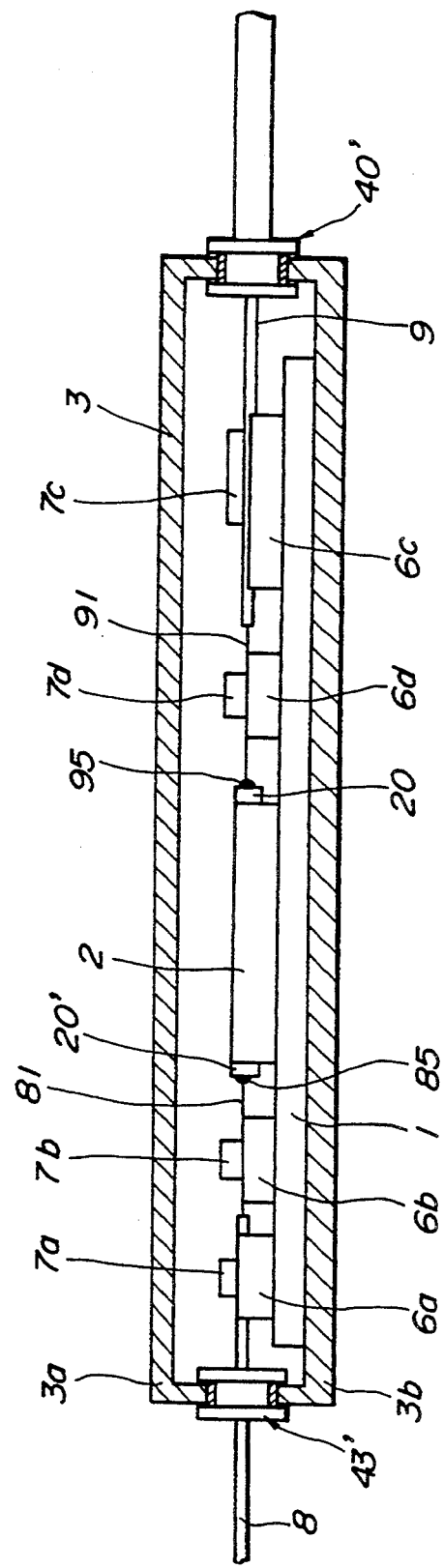
FIG. 19 is a vertical cross-sectional view of the optical waveguide device shown in FIG. 18.

The optical waveguide device, with the above splicing structure, according to the fourth embodiment is illustrated in FIGS. 18 and 19. The major components of the optical waveguide device according to the fourth embodiment are substantially identical to those of the optical waveguide devices according to the first and second embodiments. The input and output optical fiber cables 8, 9 are introduced into the casing 3 from respective opposite ends of the casing 3 as with the second embodiment. The optical waveguide device according to the fourth embodiment has bushings 40', 43' which may be of the hermetically sealed structure as with the bushings 40, 43 according to the second embodiment.

With the optical waveguide device according to the fourth embodiment, the optical waveguide and the optical fibers can easily and quickly be spliced to each other. The splicing structure of the fourth embodiment can sufficiently withstand external forces such as shocks, thus minimizing the risk of axial misalignment between the optical waveguide and the optical fibers.

FIGS. 20 through 26 show an optical waveguide device according to a fifth embodiment of the present invention.

The optical waveguide device according to the fifth embodiment resides in a further special splicing structure for allowing an optical waveguide and an optical fiber to be spliced easily and quickly while maintaining a desired optical propagation efficiency.

Figure 20:
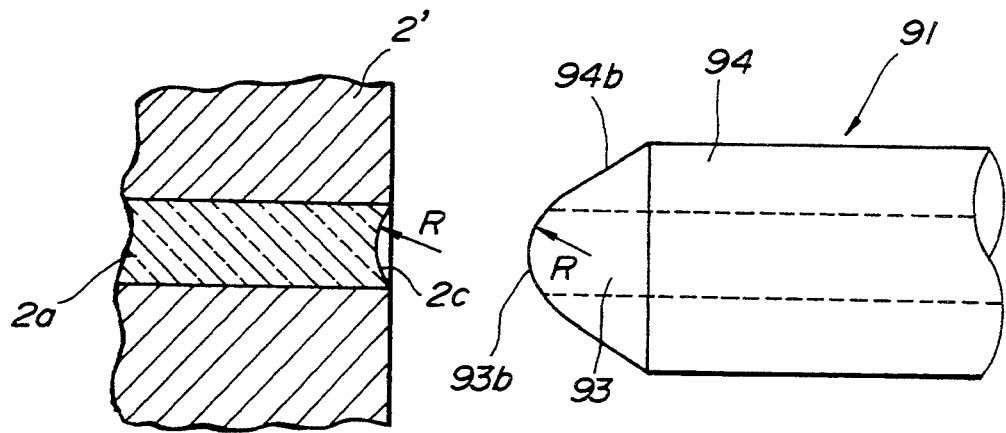
FIG. 20 is a side elevational view, partly in cross section, of an optical waveguide (substrate) and an optical fiber, before they are spliced, for use in an optical waveguide device according to a fifth embodiment of the present invention.
Figure 21:
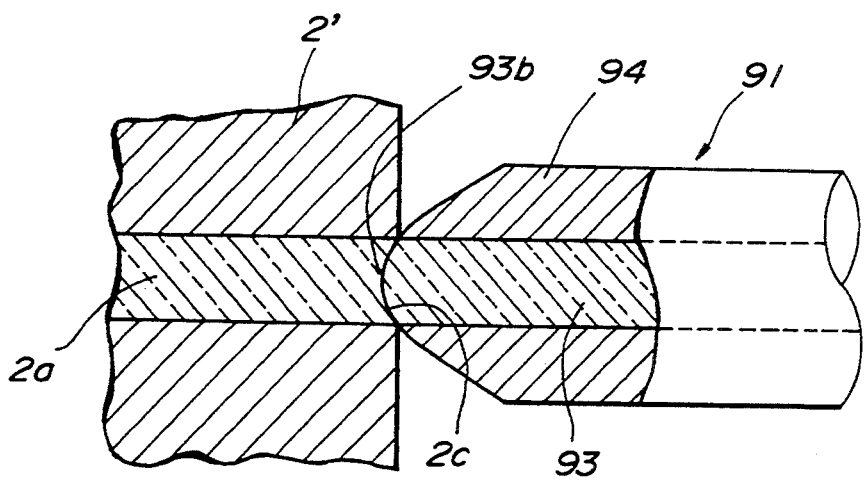
FIG. 21 is a side elevational view, partly in cross section, of the optical waveguide and the optical fiber, after they are spliced, shown in FIG. 20.
Figure 22:
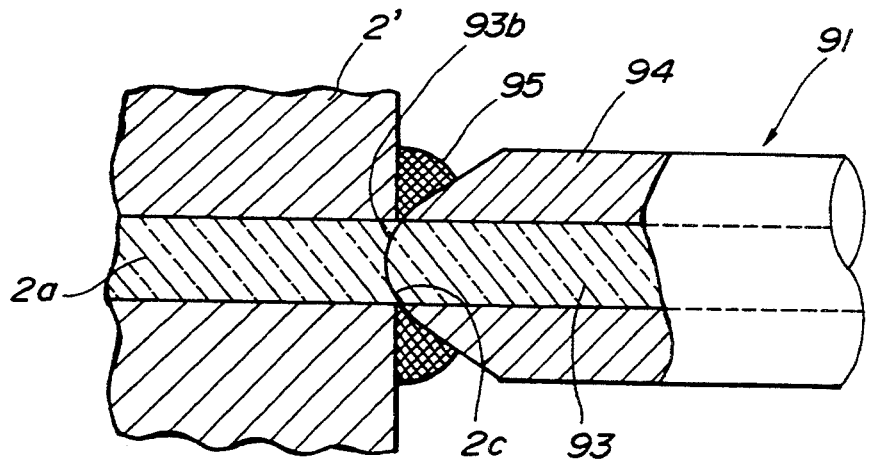
FIG. 22 is a side elevational view, partly in cross section, of the optical waveguide and the optical fiber shown in FIG. 21 with an adhesive applied.

In FIGS. 20 through 22, only one set of an optical waveguide, an optical fiber, and a positioning hole are shown for the sake of brevity. As shown in FIG. 20, an optical waveguide substrate 2' has an optical waveguide 2a with an exposed end face 2c in the form of a concave spherical surface having a radius R of curvature, and an optical fiber 91 includes a core 94 having a distal end face 93b in the form of a convex spherical surface having a radius R of curvature and a cladding 94 having a tapered distal end face 94b. To splice the optical waveguide substrate 2' and the optical fiber 91, as shown in FIG. 21, the distal end face 93b of the core 93 of the optical fiber 91 is fitted into the end face 2c of the optical waveguide 2a, so that they are mechanically spliced to each other. The optical waveguide 2a and the optical fiber 91 can thus easily axially aligned with each other by simply fitting the distal end face 93b in the end face 2c. As shown in FIG. 22, an adhesive 95, e.g., an ultraviolet-curing resin, may be filled between the end of the optical waveguide substrate 2' and the distal end face 94b of the cladding 94 around the distal end face 93b of the core 93 to bond the optical waveguide 2a and the optical fiber 91 to each other.

Figure 23:
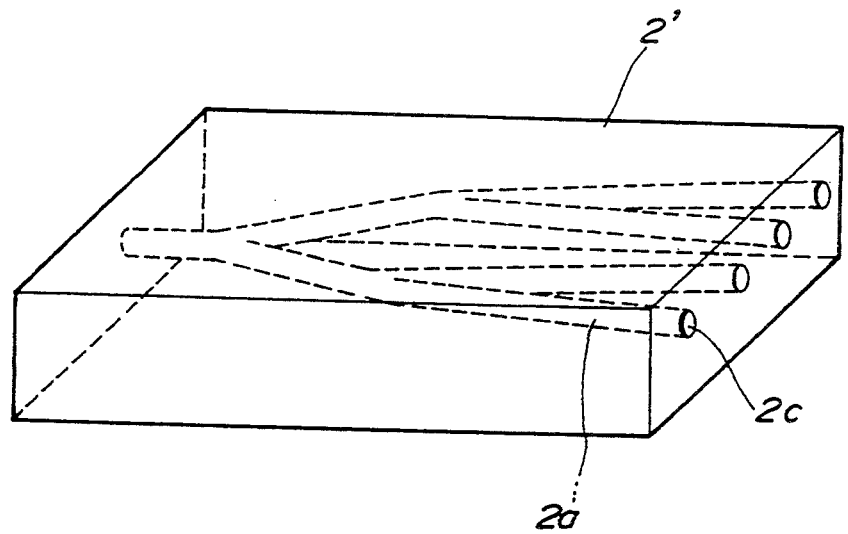
FIG. 23 is a perspective view of an optical waveguide substrate for use in the optical waveguide device according to the fifth embodiment of the present invention.
Figure 24:
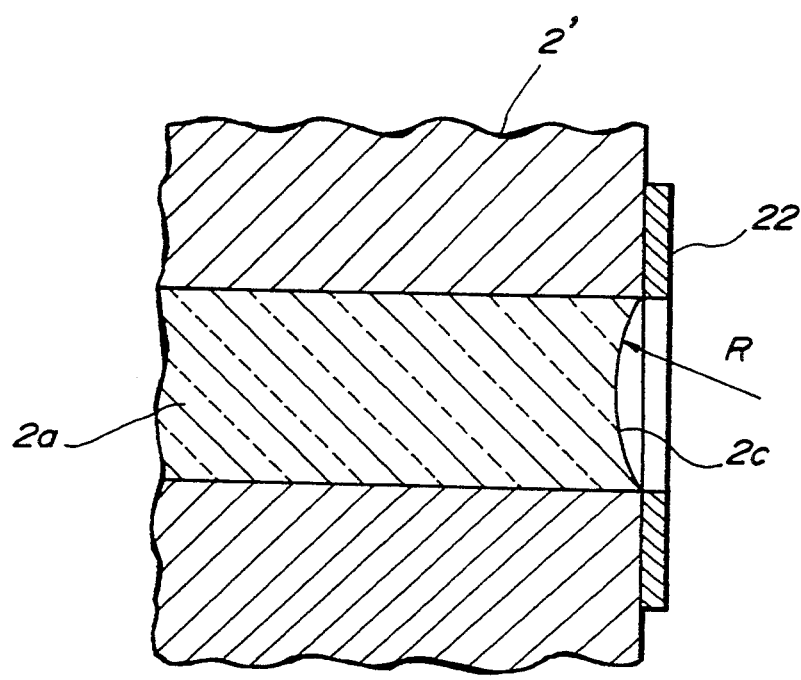
FIG. 24 is a fragmentary cross-sectional view of a photomask fixed to a side of an optical waveguide substrate for forming the substrate structure shown in FIG. 20.

In the fifth embodiment, the splicing structure is used on the flat optical waveguide substrate 2' with the optical waveguide 2a for dividing a single light signal into four light signals as shown in FIG. 23. The end face 2c of each of the waveguide paths of the optical waveguide 2a is shaped to a concave spherical end surface irrespective of whether it may be spliced to the input optical fiber 81 or each of the output optical fibers 91. The concave spherical end face 2c of the optical waveguide 2a may be formed by holding a photomask 22 (see FIG. 24) having a hole of a predetermined diameter against the end of the optical waveguide substrate 2' to expose the end face 2c of the optical waveguide 2a through the hole in the photomask 22, and then shaping the end face 2c into a concave spherical surface having a radius R of curvature according to the photolithographic or etching process. In the fifth embodiment, the end face 2c of the optical waveguide 2a is in the shape of a concave spherical surface having a radius R of curvature and the end face 93b of the core 93 of the optical fiber 91 is in the shape of a convex spherical surface having a radius R of curvature. However, the end face 2c of the optical waveguide 2a may be in the shape of a convex spherical surface having a radius R of curvature and the end face 93b of the core 93 of the optical fiber 91 may be in the shape of a concave spherical surface having a radius R of curvature.

Figure 25:
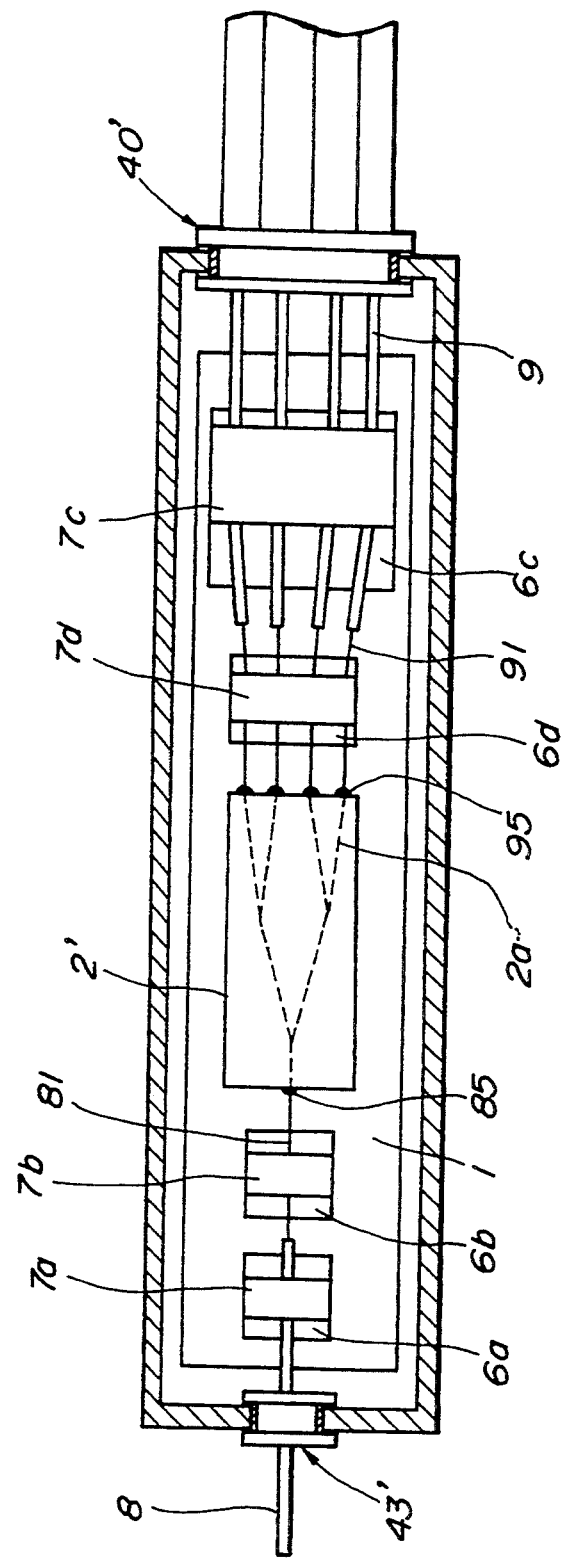
FIG. 25 is a horizontal cross-sectional view of the optical waveguide device according to the fifth embodiment of the present invention.
Figure 26:
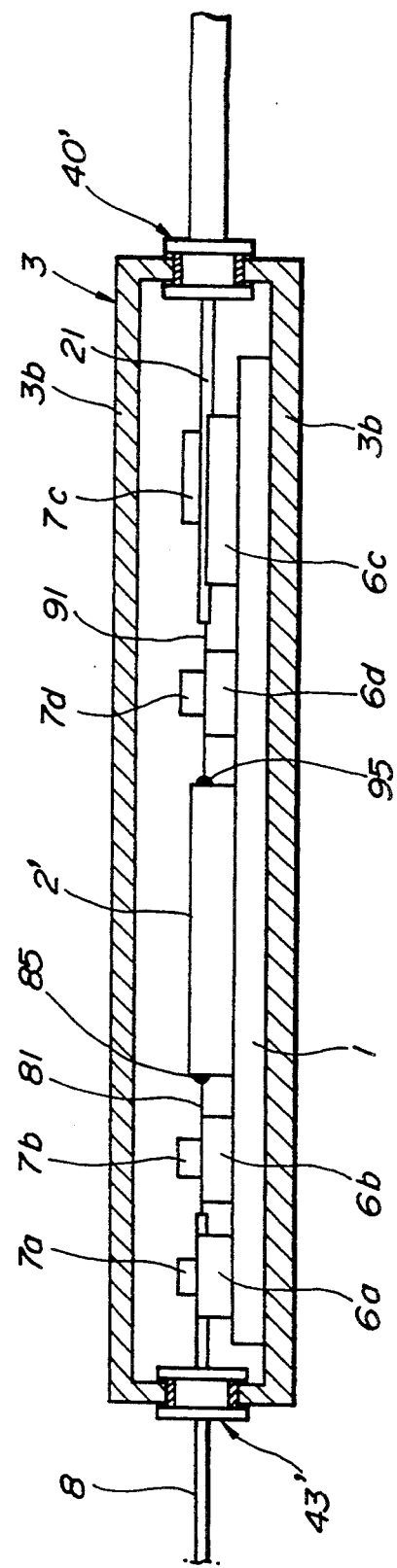
FIG. 26 is a vertical cross-sectional view of the optical waveguide device shown in FIG. 25.

The optical waveguide device, with the above splicing structure, according to the fifth embodiment is illustrated in FIGS. 25 and 26. The major components of the optical waveguide device according to the fifth embodiment are substantially identical to those of the optical waveguide devices according to the first and second embodiments. The input and output optical fiber cables 8, 9 are introduced into the casing 3 from respective opposite ends of the casing 3 as with the second embodiment. The optical waveguide device according to the fifth embodiment has bushings 40', 43' which may be of the hermetically sealed structure as with the bushings 40, 43 according to the second embodiment.

With the optical waveguide device according to the fifth embodiment, the optical waveguide and the optical fibers can easily and quickly be spliced to each other. The splicing structure of the fifth embodiment can sufficiently withstand external forces such as shocks, thus minimizing the risk of axial misalignment between the optical waveguide and the optical fibers.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An optical waveguide device comprising:
   a casing having an outer surface and an inner surface;
   a base member housed in said casing;
   means for resiliently supporting said base member, said supporting means fixedly mounted on said inner surface of said casing;
   at least one input optical fiber cable and at least one output optical fiber cable, at least a portion of said input optical fiber cable and at least a portion of said output optical fiber cable extending into said casing;
   an optical waveguide substrate mounted on said base member, said optical waveguide substrate connected to said portions of said input and output optical fiber cables for transmitting a light signal from said input optical fiber cable to said output optical fiber cable;
   means fixed to said base member for holding said portions of said input and output optical fiber cables on said base member; and
   means in said casing for introducing said input and output optical fiber cables into said casing.

2. The optical waveguide device of claim 1, wherein said optical waveguide substrate has an optical waveguide branched into a plurality of waveguide paths, said input and output optical fiber cables being coupled to each other through said optical waveguide.

3. The optical waveguide device of claim 1, wherein said casing comprises an upper casing member and a lower casing member which are coupled to each other, said introducing means comprising a pair of bushings disposed in respective boundaries between said upper and lower casing members at respective opposite ends of said casing, said input optical fiber cable being introduced into said casing through one of said bushings, said output optical fiber cable being introduced into said casing through the other of said bushings.

4. The optical waveguide device of claim 1, wherein said casing comprises an upper casing member and a lower casing member which are coupled to each other, said introducing means comprising a single bushing disposed in a boundary between said upper and lower casing members at one end of said casing, said input and output optical fiber cables being introduced into said casing through said single bushing.

5. The optical waveguide device of claim 3, wherein each of said bushings comprises a hollow bushing with a space defined therein, said hollow bushing having at least two through holes, said input and output optical fiber cables extending through said through holes and said space, said space being filled with a resin.

6. The optical waveguide device of claim 5, wherein said hollow bushing further includes a first through hole for filling the resin into said space and a second through hole for discharging air from said space as the resin is filled into said space.

7. The optical waveguide device of claim 1, wherein said base member includes peripheral edge portions and said supporting means comprises a plurality of support members, each of said support members gripping at least a portion of said peripheral edge portions of said base member.

8. The optical waveguide device of claim 1, wherein said base member includes peripheral edge portions, said casing being filled with oil, said supporting means comprising a support member gripping an entire peripheral edge portion of said base member in surrounding relationship thereto, said support member and said peripheral edge portion of said base member jointly defining a space filled with said oil for allowing said base member to be displaced when the optical waveguide device is subjected to external forces.

9. The optical waveguide device of claim 9, wherein said base member and said support member gripping the entire peripheral edge portion of said base member divide said casing into a first space and a second space, said support member having a plurality of orifices providing communication between said space filled with oil and said first space, said base member including a plurality of orifices providing communication between said first space and said second space.

10. An optical waveguide device comprising:
    a casing having an outer surface and an inner surface;
    a base member housed in said casing;
    at least one input optical fiber cable and at least one output optical fiber cable, at least a portion of said input optical fiber cable and at least a portion of said output optical fiber cable being introduced into said casing;
    an optical waveguide substrate mounted on said base member, said optical waveguide connected to said portions of said input and output optical fiber cables for transmitting a light signal from said input optical fiber cable to said output optical fiber cable;
    means fixed to said base member for holding said portions of said input and output optical fiber cables on said base member;
    means in said casing for introducing said input and output optical fibers into said casing;
    a package, the package sealingly housing said base member, said optical waveguide substrate, said portions of said input and output optical fiber cables, and said holding means;
    a mount, said package being fixedly mounted on said mount; and
    means fixedly mounted on said inner surface of said casing for supporting said mount in said casing.

11. The optical waveguide device of claim 10, wherein said mount includes at least one peripheral edge, said casing being filled with oil, said support means comprising a support member for gripping at least one of said peripheral edges of said mount, said support member and said peripheral edge of said mount jointly defining a space for filling with oil for allowing said mount to be displaced when said optical waveguide device is subjected to external forces.

12. The optical waveguide device of claim 11, wherein said mount and said support member divide said casing into a first space and a second space, said support member having a plurality of orifices providing communication between said space filled with oil and said first space, said mount including a plurality of orifices providing communication between said first space and said second space.

13. An optical waveguide device comprising:
a casing;
a base member housed in said casing;
at least one input optical fiber cable and at least one output optical fiber cable, at least a portion of said input optical fiber cable and at least a portion of said output optical fiber cable being introduced into said casing;
an optical waveguide substrate mounted on said base member, said optical waveguide connected to said portions of each of said input and output optical fiber cables for transmitting a light signal from said input optical fiber cable to said output optical fiber cable, said optical waveguide substrate including an optical waveguide branched into a plurality of waveguide paths, said input optical fiber cable and said output optical fiber cable being coupled to each other through said optical waveguide;
means fixed to said base member for holding said portions of said input and output optical fiber cables on said base member;
means in said casing for introducing said input and output optical fibers into said casing; and
a guide member held against said optical waveguide substrate, said guide member having a positioning hole through which an end face of at least one of the waveguide paths is exposed, at least one of said portions of said input and output optical fiber cables being inserted in said positioning hole and held against said end face.

14. The optical waveguide device of claim 13, wherein said guide member includes an outer surface, at least one of said input and output optical fiber cables has a core and a cladding surrounding said core, said cladding having a tapered end at said end inserted in said positioning hole, and further comprising an adhesive filled between said tapered end of the cladding and said outer surface of said guide member.

15. An optical waveguide device comprising:
a casing;
a base member housed in said casing;
at least one input optical fiber cable and at least one output optical fiber cable, at least a portion of said input optical fiber cable and at least a portion of said output optical fiber cable being introduced into said casing;
an optical waveguide substrate having a plurality of ends mounted on said base member, said optical waveguide connected to said portions of each of said input and output optical fiber cables for transmitting a light signal from said input optical fiber cable to said output optical fiber cable, said optical waveguide substrate including an optical waveguide branched into a plurality of waveguide paths, said input optical fiber cable and said output optical fiber cable being coupled to each other through said optical waveguide, at least one of said waveguide paths including a concave spherical end face exposed at an end of said optical waveguide substrate, at least one of said input and output optical fiber cables having a convex spherical end face fitted in said concave spherical end face;
means fixed to said base member for holding said portions of said input and output optical fiber cables on said base member; and
means in said casing for introducing said input and output optical fibers into said casing.

16. The optical waveguide device of claim 15, wherein at least one of said input and output optical fiber cables has a core and a cladding surrounding said core, said cladding having a tapered end, further comprising an adhesive filled between said end of said optical waveguide substrate and said tapered end of the cladding around said concave spherical end face and said convex spherical end face fitted therein.

17. An optical waveguide device comprising:
a casing having an outer surface and an inner surface;
a base member housed in said casing, said base member including peripheral edge portions;
means for resiliently supporting said base member, said supporting means fixedly mounted on said inner surface of said casing;
at least one input optical fiber cable and at least one output optical fiber cable, at least a portion of said input optical fiber cable and at least a portion of said output optical fiber cable extending into said casing;
an optical waveguide substrate mounted on said base member, said optical waveguide substrate connected to said portions of said input and output optical fiber cables for transmitting a light signal from said input optical fiber cable to said output optical fiber cable;
means fixed to said base member for holding said portions of said input and output optical fiber cables on said base member; and
means in said casing for introducing said input and output optical fiber cables into said casing, said casing being filled with oil, said supporting means comprising a support member gripping an entire peripheral edge portion of said base member in surrounding relationship thereto, said support member and said peripheral edge portion of said base member jointly defining a space filled with said oil for allowing said base member to be displaced when the optical waveguide device is subjected to external forces.

18. The optical waveguide device of claim 17, wherein said base member and said support member gripping the entire peripheral edge portion of said base member divide said casing into a first space and a second space, said support member having a plurality of orifices providing communication between said space filled with oil and said first space, said base member including a plurality of orifices providing communication between said first space and said second space.

* * * * *